(12) United States Patent
Nakagawa et al.

(10) Patent No.: US 10,967,253 B2
(45) Date of Patent: Apr. 6, 2021

(54) OPERATION DEVICE AND METHOD FOR CONTROLLING THE SAME

(71) Applicant: Sony Interactive Entertainment Inc., Tokyo (JP)

(72) Inventors: Yusuke Nakagawa, Kanagawa (JP); Ikuo Yamano, Tokyo (JP); Shinichi Hirata, Kanagawa (JP); Yuichi Machida, Kanagawa (JP); Yoichi Nishimaki, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 67 days.

(21) Appl. No.: 16/311,774

(22) PCT Filed: May 19, 2017

(86) PCT No.: PCT/JP2017/018914
§ 371 (c)(1),
(2) Date: Dec. 20, 2018

(87) PCT Pub. No.: WO2018/020794
PCT Pub. Date: Feb. 1, 2018

(65) Prior Publication Data
US 2019/0209919 A1      Jul. 11, 2019

(30) Foreign Application Priority Data

Jul. 26, 2016   (JP) .............................. JP2016-146603

(51) Int. Cl.
*A63F 13/24*      (2014.01)
*A63F 13/285*    (2014.01)
(Continued)

(52) U.S. Cl.
CPC ............. *A63F 13/24* (2014.09); *A63F 13/285* (2014.09); *G05G 5/03* (2013.01); *G06F 3/01* (2013.01);
(Continued)

(58) Field of Classification Search
None
See application file for complete search history.

(56) References Cited

U.S. PATENT DOCUMENTS 5,734,373 A     3/1998  Rosenberg
5,982,354 A  *  11/1999  Arita ................... A63F 9/0291
                                                               345/158
(Continued)

FOREIGN PATENT DOCUMENTS

EP     0626634 A2    11/1994
EP     0852789 A1     7/1998
(Continued)

OTHER PUBLICATIONS

International Search Report for corresponding PCT Application No. PCT/JP2017/018914, 2 pages, dated Aug. 22, 2017.
(Continued)

*Primary Examiner* — Seng H Lim
(74) *Attorney, Agent, or Firm* — Matthew B. Dernier, Esq.

(57) ABSTRACT

An operating device includes a movable part capable of moving between a first position and a second position, with the movable part being capable of operation by the finger of the user gripping the operating device. The operating device includes a regulating part that regulates a range in which the movable part can move, and a control part that determines the amount of regulation in which the movable part can move and provides the regulating part with an instruction to regulate the range in which the movable part can move (Continued)

according to the amount of regulation which has been determined.

7 Claims, 8 Drawing Sheets

(51) Int. Cl.
| | | |
|---|---|---|
| *G06F 3/0338* | (2013.01) | |
| *G06F 3/01* | (2006.01) | |
| *G05G 5/03* | (2008.04) | |
| *G05G 9/047* | (2006.01) | |
| *A63F 13/211* | (2014.01) | |
| *A63F 13/235* | (2014.01) | |
| *G06F 3/0346* | (2013.01) | |

(52) U.S. Cl.
CPC .......... *G06F 3/0338* (2013.01); *A63F 13/211* (2014.09); *A63F 13/235* (2014.09); *G05G 9/047* (2013.01); *G05G 9/04788* (2013.01); *G05G 2009/04774* (2013.01); *G06F 3/0346* (2013.01)

(56) References Cited

U.S. PATENT DOCUMENTS

| | | | |
|---|---|---|---|
| 5,999,168 A | 12/1999 | Rosenberg | |
| 6,380,925 B1 | 4/2002 | Martin | |
| 6,468,158 B1 | 10/2002 | Ootori | |
| 7,196,688 B2 | 3/2007 | Schena | |
| 8,059,089 B2 | 11/2011 | Daniel | |
| 8,491,388 B2 | 7/2013 | Miyazaki | |
| 9,164,587 B2 | 10/2015 | Da Costa | |
| 9,174,134 B1* | 11/2015 | Grant | A63F 13/98 |
| 9,490,088 B2 | 11/2016 | Sawada | |
| 9,606,569 B2 | 3/2017 | Ueda | |
| 9,785,237 B2 | 10/2017 | Shinozaki | |
| 10,124,252 B2 | 11/2018 | Grant | |
| 10,133,354 B2 | 11/2018 | Grant | |
| 10,159,896 B2* | 12/2018 | Strahle | A63F 13/25 |
| 10,185,396 B2 | 1/2019 | Rihn | |
| 10,216,278 B2 | 2/2019 | Nakamura | |
| 10,226,693 B2* | 3/2019 | Strahle | A63F 13/24 |
| 10,353,471 B2 | 7/2019 | Da Costa | |
| 10,509,472 B2* | 12/2019 | Grant | G06F 3/0338 |
| 10,534,432 B2 | 1/2020 | Okumura | |
| 10,632,367 B2* | 4/2020 | Strahle | A63F 13/24 |
| 2001/0008849 A1 | 7/2001 | Komata | |
| 2001/0030658 A1 | 10/2001 | Rosenberg | |
| 2002/0054060 A1 | 5/2002 | Schena | |
| 2002/0190528 A1* | 12/2002 | Ootori | A63F 13/285 |
| | | | 290/45 |
| 2004/0113932 A1 | 6/2004 | Rosenberg | |
| 2005/0156892 A1 | 7/2005 | Grant | |
| 2006/0028095 A1 | 2/2006 | Maruyama | |
| 2009/0131171 A1 | 5/2009 | Miyazaki | |
| 2011/0134034 A1 | 6/2011 | Daniel | |
| 2012/0105367 A1 | 5/2012 | Son | |
| 2012/0154134 A1 | 6/2012 | Lim | |
| 2013/0147610 A1* | 6/2013 | Grant | A63F 13/24 |
| | | | 340/12.5 |
| 2013/0265149 A1 | 10/2013 | Nakamura | |
| 2013/0267321 A1* | 10/2013 | Burgess | A63F 13/92 |
| | | | 463/37 |
| 2013/0321273 A1 | 12/2013 | O'Keeffe | |
| 2014/0094310 A1 | 4/2014 | Bleich | |
| 2014/0274398 A1 | 9/2014 | Grant | |
| 2014/0305783 A1 | 10/2014 | Sawada | |
| 2014/0315642 A1* | 10/2014 | Grant | A63F 13/212 |
| | | | 463/38 |
| 2015/0002416 A1 | 1/2015 | Koike | |
| 2015/0035658 A1 | 2/2015 | Provancher | |
| 2015/0042461 A1 | 2/2015 | Shinozaki | |
| 2015/0098004 A1 | 4/2015 | Ueda | |
| 2015/0130707 A1 | 5/2015 | Da Costa | |
| 2015/0133221 A1* | 5/2015 | Danny | A63F 13/98 |
| | | | 463/37 |
| 2016/0132114 A1 | 5/2016 | Rihn | |
| 2016/0259536 A1 | 9/2016 | Kudurshian | |
| 2016/0313795 A1 | 10/2016 | Muramatsu | |
| 2016/0361639 A1* | 12/2016 | Schmitz | A63F 13/218 |
| 2017/0031442 A1 | 2/2017 | Dabic | |
| 2017/0203208 A1* | 7/2017 | Sato | G05G 5/03 |
| 2018/0018020 A1* | 1/2018 | Grant | G06F 3/016 |
| 2018/0250587 A1* | 9/2018 | Strahle | A63F 13/25 |
| 2018/0333642 A1* | 11/2018 | Strahle | A63F 13/25 |
| 2019/0025916 A1 | 1/2019 | Okumura | |
| 2019/0038968 A1 | 2/2019 | Machida | |
| 2019/0118081 A1* | 4/2019 | Strahle | A63F 13/24 |
| 2019/0224565 A1* | 7/2019 | Yamano | A63F 13/23 |

FOREIGN PATENT DOCUMENTS

| | | |
|---|---|---|
| EP | 1524578 A1 | 4/2005 |
| EP | 2778852 A2 | 9/2014 |
| EP | 2796965 A2 | 10/2014 |
| EP | 2873446 A1 | 5/2015 |
| JP | 7194846 A | 8/1995 |
| JP | 07220563 A | 8/1995 |
| JP | 11514469 A | 12/1999 |
| JP | 2000195370 A | 7/2000 |
| JP | 2003519861 A | 6/2003 |
| JP | 2003330585 A | 11/2003 |
| JP | 2005190465 A | 7/2005 |
| JP | 2006157642 A | 6/2006 |
| JP | 2007330369 A | 12/2007 |
| JP | 2008173186 A | 7/2008 |
| JP | 2008257295 A | 10/2008 |
| JP | 2008257748 A | 10/2008 |
| JP | 2009119125 A | 6/2009 |
| JP | 2010020526 A | 1/2010 |
| JP | 2012118761 A | 6/2012 |
| JP | 2012128499 A | 7/2012 |
| JP | 2013045230 A | 3/2013 |
| JP | 2013117900 A | 6/2013 |
| JP | 2014174660 A | 9/2014 |
| JP | 2014180572 A | 9/2014 |
| JP | 2014216017 A | 11/2014 |
| JP | 201511470 A | 1/2015 |
| JP | 2015075912 A | 4/2015 |
| JP | 2015111417 A | 6/2015 |
| JP | 2015111542 A | 6/2015 |
| JP | 2016001510 A | 1/2016 |
| JP | 2016067667 A | 5/2016 |
| JP | 2016095625 A | 5/2016 |
| JP | 2017508191 A | 3/2017 |
| KR | 20050048902 A | 5/2005 |
| KR | 1020150050070 A | 5/2015 |
| WO | 9712357 A1 | 4/1997 |
| WO | 2005116802 A1 | 12/2005 |
| WO | 2013099742 A1 | 7/2013 |
| WO | 2015092966 A1 | 6/2015 |
| WO | 2016051986 A1 | 4/2016 |
| WO | 2017150128 A1 | 9/2017 |
| WO | 2017150129 A1 | 9/2017 |

OTHER PUBLICATIONS

Korean Office Action for corresponding Application No. 1020197002594, 11 pages, dated Sep. 18, 2019.
Notification of Reasons for Refusal for corresponding JP Application No. 2018-528391, 9 pages, dated Apr. 23, 2019.
Office Action for related U.S. Appl. No. 16/075,265, 9 pages, dated Jul. 23, 2019.
International Search Report for related PCT Application No. PCT/JP2017/035570, 8 pages, dated Dec. 26, 2017.
Extended European Search Report for corresponding European Application No. 17759599.8, 7 pages, dated Sep. 9, 2019.
International Preliminary Report on Patentability and Written Opinion for related PCT Application No. PCT/JP2017/0179090, 17 pages, dated Feb. 7, 2019.

(56) References Cited

OTHER PUBLICATIONS

International Preliminary Report on Patentability and Written Opinion for corresponding PCT Application No. PCT/JP2017/018914, 13 pages, dated Feb. 7, 2019.
International Preliminary Report on Patentability and Written Opinion for related PCT Application No. PCT/PCT/20171004978, 13 pages, dated Jan. 31, 2019.
Office Action for corresponding Korean Application No. 10-2019-7002594, 10 pages, dated Mar. 26, 2020.
International Search report for related application PCT/JP2017/038937, 4 pages, dated Jan. 30, 2018.
International Search Report for related PCT Application No. PCT/JP2017/004763, 2 pages, dated Apr. 18, 2017.
International Preliminary Report on Patentability and Written Opinion for related PCT Application No. PCT/JP2017/004763, 11 pages, dated Sep. 13, 2018.
International Search Report for related PCT Application No. PCT/2017/004978, 4 pages, dated Mar. 14, 2017.
International Search Report for related PCT Application No. PCT/JP2017/017909, 7 pages, dated Jul. 18, 2017.
Extended European Search Report for corresponding Application No. 17833805.9, 14 pages, dated Nov. 6, 2019.
Notification of Reasons for Refusal for corresponding Application No. JP2018-529371, 9 pages, dated Oct. 29, 2019.
Extended European Search Report for related EP Application No. 17833789.5, 10 pages, dated May 23, 2019.
Supplementary Search Report for corresponding European Search Report for corresponding Application No. 17833805, 12 pages, dated Jul. 19, 2019.
Decision of Refusal for corresponding Japanese Patent Application No. 2018-528391, 10 pages, dated Jul. 9, 2019.
International Preliminary Report on Patentability and Written Opinion for related PCT Application No. PCT/JP2017/038937, 14 pages, dated May 7, 2020.
International Preliminary Report on Patentability and Written Opinion for related PCT Application No. PCT/JP2017/035570, 20 pages, dated Apr. 9, 2020.
Notice of Reason for Refusal for corresponding JP Application No. 2019-214619, 6 pages, dated Sep. 2, 2020.
Notice of Reason for Refusal for corresponding JP Application No. 2019-184529, 10 pages, dated Sep. 2, 2020.
Notice of Reason for Refusal for corresponding JP Application No. 2019-221160, 6 pages, dated Sep. 18, 2020.

\* cited by examiner (A)

(B)

OPERATION DEVICE AND METHOD FOR CONTROLLING THE SAME

TECHNICAL FIELD

The present invention relates to an operating device and a method for controlling the operating device.

BACKGROUND ART

The home game machine is provided with an operating device which detects user's action such as button depression and device shaking and sends the information representing the thus detected user's action to the main body of the game machine. Some of the operating devices are so designed as to give the user the sense of touch and force by means of an actuator.

SUMMARY

Technical Problem

The existing operating device mentioned above which expresses the sense of touch and force has the disadvantage of being unable to express the texture and feel, such as hardness, of the object which the user grips by hand while playing the game.

The present invention was completed in view of the foregoing. Thus, it is an object of the present invention to provide an operating device and a method for controlling the operating device, the operating device being capable of expressing to the user the texture and feel of the object which the user grips by hand while playing the game.

Solution to Problem

In order to solve the related art subject described above, an operating device includes a movable part capable of moving between a first position and a second position, with the movable part being capable of operation by a finger of a user gripping the operating device. The operating device includes a regulating part that regulates a range in which the movable part can move, and a control part that determines an amount of regulation in which the movable part can move and provides the regulating part with an instruction to regulate the range in which the movable part can move according to the amount of regulation which has been determined.

Advantageous Effect of Invention

The controlling device according to the present invention permits the user to feel the texture of the object which the user virtually grips while playing the game.

DESCRIPTION OF EMBODIMENT

One embodiment of the present invention will be described below with reference to the accompanying drawings. The illustrated parts and their size, ratio, and arrangement are a mere example and are not intended to restrict the scope of the present invention.

An operating device 10 pertaining to one embodiment of the present invention is connected to a main unit 20 of the home game machine or the like through a wired or wireless circuit. The operating device 10 sends to the main unit 20 the content of operation indicated by the user. The operating device 10 also receives instructions entered from the main unit 20 so that it controls various parts. The action of the operating device 10 will be described later in more detail.

Figure 1:
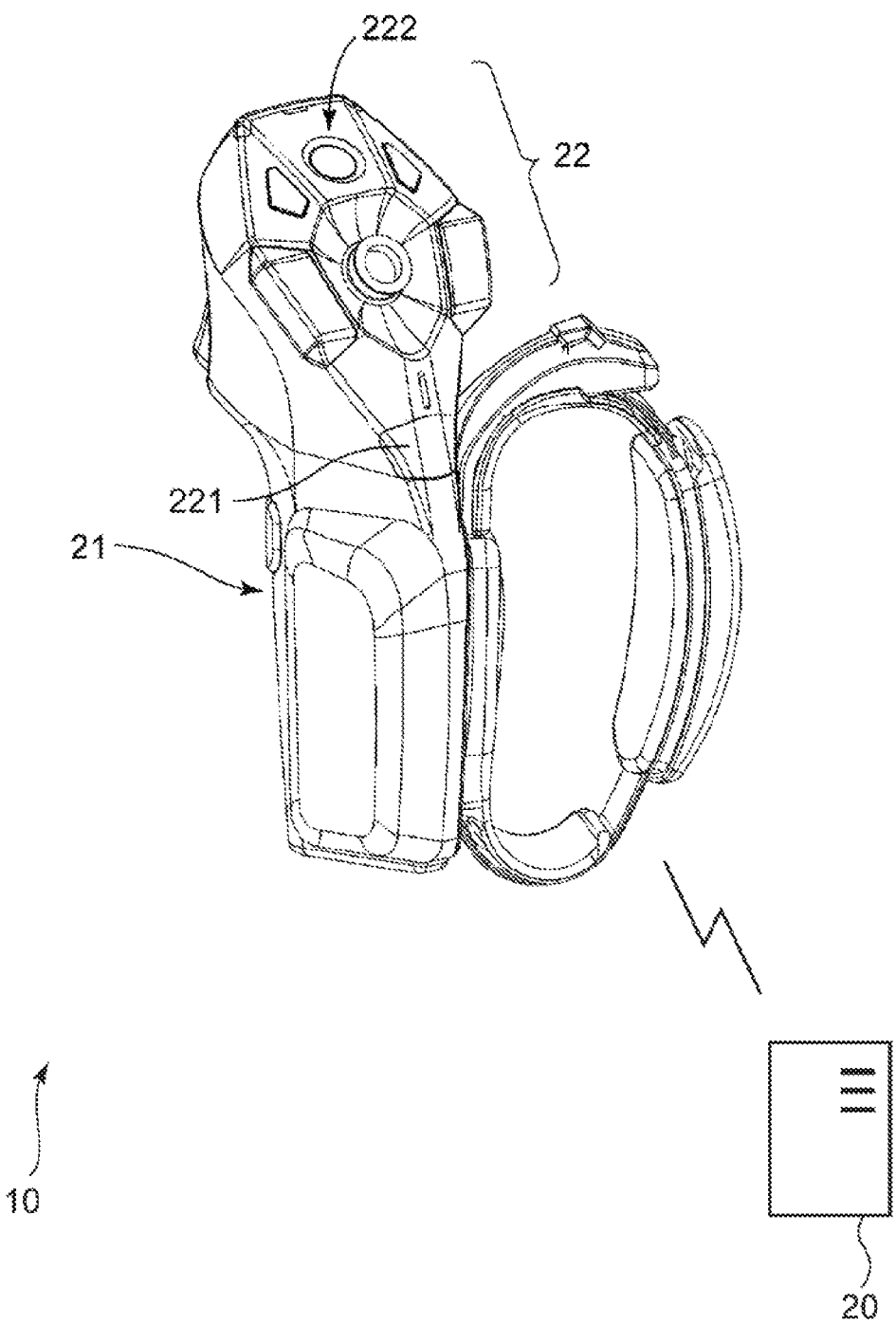
FIG. 1 is a perspective view seen from front of an operating device pertaining to one embodiment of the present invention.
Figure 2:
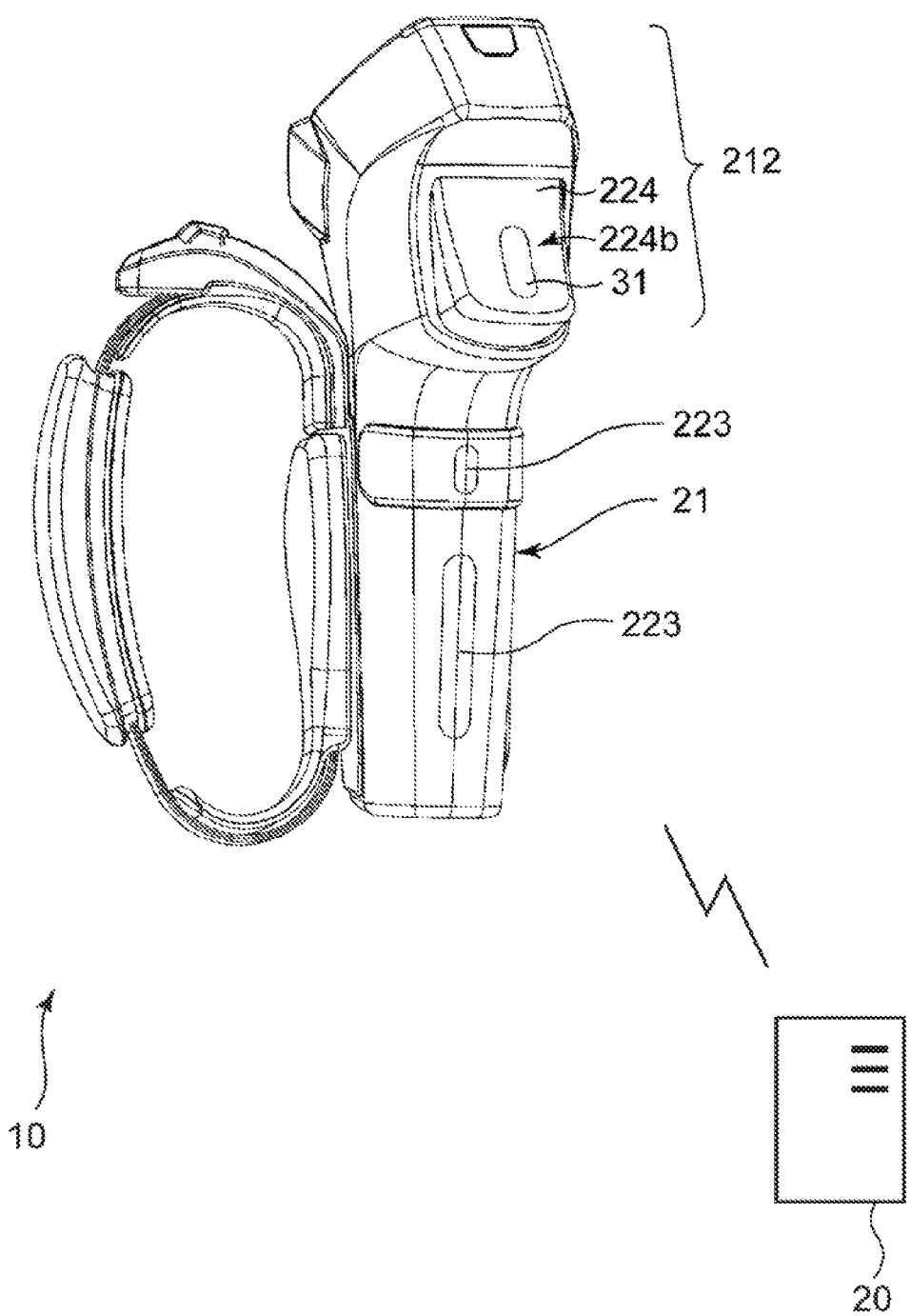
FIG. 2 is a perspective view seen from rear of the operating device pertaining to one embodiment of the present invention.

The operating device 10 according to one embodiment of the present invention is designed on the assumption that it will be held by the user's left or right hand. An example of the operating device 10 is depicted in FIGS. 1 and 2. FIG. 1 is a front perspective view of the operating device 10, and FIG. 2 is a rear perspective view of the operating device 10.

Figure 3:
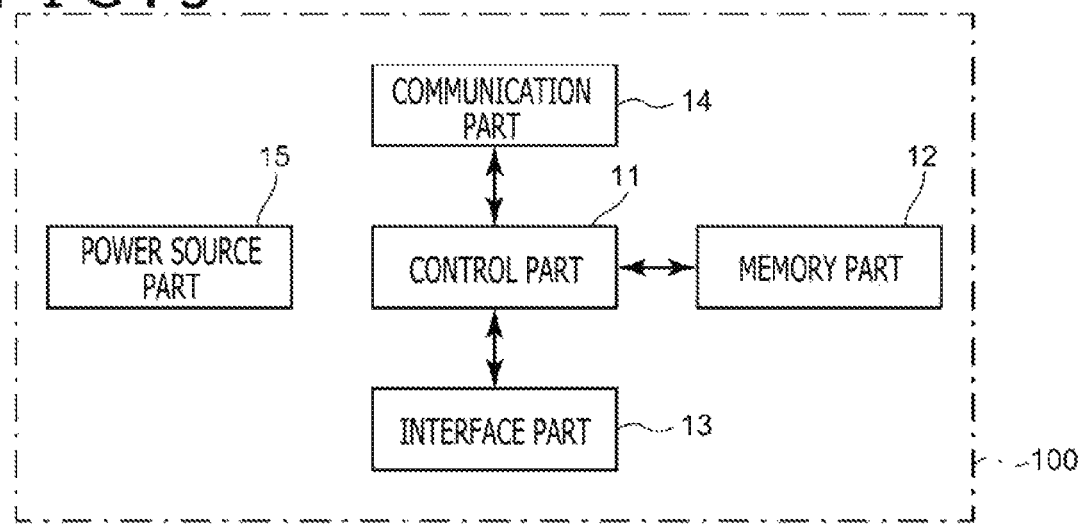
FIG. 3 is a block diagram depicting an example of a circuit unit of the operating device pertaining to one embodiment of the present invention.

The operating device 10 includes a grip part 21 (to be gripped by the user) and an operation part 22. The grip part 21 is substantially shaped like a polygonal column. The operation part 22 is so formed as to extend from the grip part 21. In the case depicted in FIGS. 1 and 2, the operation part 22 has a sensor part 221 and a button control part 222 on its front side. In addition, the operation part 22 has on its rear side of the operating device 10 a finger sensor 223 and a rocking button 224 (which is a movable part). The operating device 10 has a circuit part 100 in its main body as depicted in FIG. 3. The circuit part 100 includes a control part 11, a memory part 12, an interface part 13, a communication part 14, and a power source part 15.

The control part 11 is a program-controlled device such as microcomputer, and it works according to the program stored in the memory part 12. The control part 11 works as mentioned later. The memory part 12 is a memory device that holds the program to be executed by the control part 11. The memory part 12 functions also as the work memory for the control part 11.

The interface part 13 is connected to various parts in the operation part 22 so that it receives various signals (such as user's instructions entered from the sensor part 221 and the button control part 222) and outputs them to the control part 11. In addition, the interface part 13 receives instructions entered from the control part 11 and outputs them to various parts in the operation part 22.

The communication part 14 includes the wireless communication interface (such as Bluetooth (registered trademark)) and the wired communication interface (such as universal serial bus (USB) and wired local area network (LAN)). The communication part 14 is also connected to the main unit 20 so that it sends and receives signals to and from the main unit 20. The power source part 15, which includes a power source of secondary batteries, supplies electric power to various parts in the operating device 10. The secondary batteries of the power source part 15 may be charged when the operating device 10 is supplied with external electric power. Since charging may be accomplished by any known method, no detailed description of charging method is given herein.

According to the present embodiment, the operating device 10 has a fastening device fixed to the right or left side thereof. The fastening device may be a circular flexible belt. The user grips the operating device 10, with his or her four fingers excluding thumb passed through the fastening device and his or her thumb joint pressed against the main body of the operating device 10. FIGS. 1 and 2 depict the operating device 10 fixed by the user, with its right side pressed by the user's palm.

The operating device 10 should have a size suitable for the user to snugly grip it with his or her fingers passed through the fastening device and should be large enough for the user's thumb tip to reach the button control part 222 on its front side when the user grips it. That is, in the case of the embodiment mentioned herein, the grip part 21 is designed such that the fingers of the user gripping it reach at least some of the buttons (including the rocking buttons 224) on the operation part 22.

In other words, the grip part 21 is so designed as to permit the user naturally holding the operating device 10 to make his or her forefinger touch the rocking button 224 and to make his or her palm, middle finger, third finger, and little finger grip the grip part 21. Holding in this manner prevents the operating device 10 from dropping down when the user opens his or her hand because it is fixed to the user's hand.

The rocking button 224 corresponds to the movable part in the present invention. It is a button capable of moving between the first position (which projects toward the rear side of the operating device 10) and the second position (which is depressed into the main body of the operating device 10). The rocking button 224 can be depressed to the second position by the user's forefinger, and can be restored to the first position as the user releases his or her finger from it (because it is energized).

According to the embodiment of the present invention, the operating device 10 causes the rocking button 224 to give the user's finger the sense of touch, thereby expressing the texture and feel of the object which the user virtually holds. To be more concrete, the rocking button 224 is provided with a motor on its rotating shaft, so that the motor generates torque corresponding to the reactive force against the pressing force with which the user depresses the rocking button 224, with the reactive force corresponding to the hardness of the virtual object. Of course, in order to realize the foregoing, it is necessary to provide drive elements, such as motor, which can produce torque linearly over a broad range in correspondence to the depressing force applied to the rocking button 224 by the user, and this requirement can hardly be achieved by a small-sized motor. This situation is coped with one embodiment of the present invention in which the movable range of the rocking button 224 is changed instead of directly imparting the reactive force. In this way it becomes possible to express the texture and feel of the virtual object which the user virtually holds.

Figure 4:
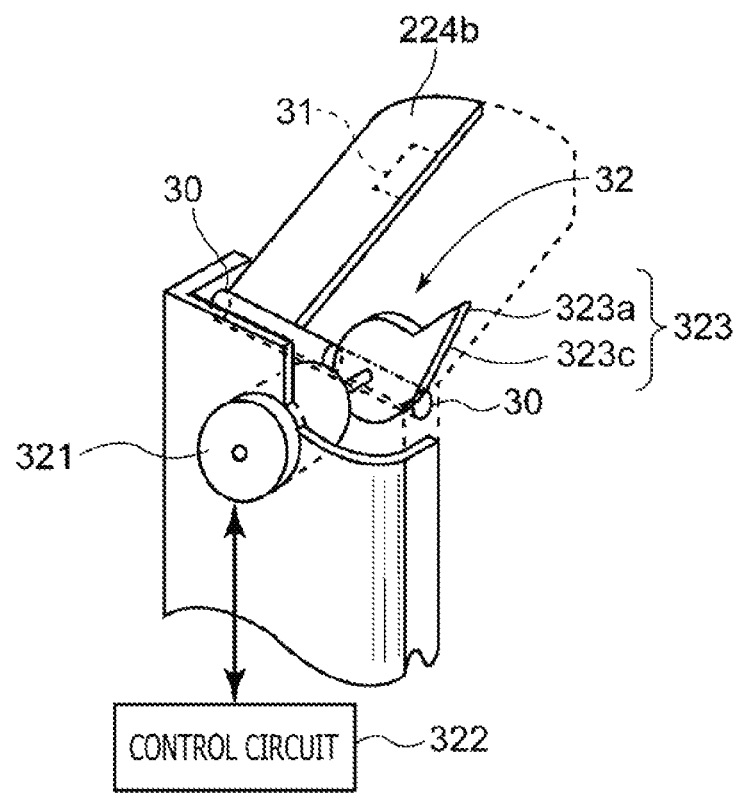
FIG. 4 is a schematic diagram depicting an example of a movable part of the operating device pertaining to one embodiment of the present invention.

To be concrete, the embodiment mentioned herein is characterized in that the rocking button 224 (depicted in FIG. 4) includes a button cover 224b, a button cover support 30, a force sensor 31 to detect the magnitude of the force which the user applies for depression, and a regulating part 32 which permits the rocking button to move within a specified range. The regulating part 32 includes the motor 321 as driving means, the control circuit 322 to control the driving means, and an arm 323 as a regulating member to be driven by the driving means. FIG. 4 is a partly cutaway view of the button cover 224b, the main body (part) of the operating device 10, and the button cover support 30.

The force sensor 31 is located at that side of the rocking button 224 with which the user's finger comes into contact. It detects, repeatedly at specified intervals, the magnitude of the force applied to the rocking button 224 by the user, and it also outputs the results of detection. To be concrete, this force sensor 31 may be any known one based on a strain sensor. The interval (or timing) for detection may be approximately 40 Hz to 1 kHz.

The button cover 224b is one of the movable parts in the present invention, and it has the face to be depressed by the user's finger. The button cover support 30 has a hinge fixed to the main body of the operating device 10. This hinge supports the button cover 224b so as to permit it to rotate around itself within a certain angular range between the first position and the second position. The button cover support 30 is energized by such an elastic body as spring to move the button cove 224b toward the first position. This mechanism permits the button cover 224b to move to the first position while the user's finger remains away from the button. In the case of the present embodiment, the energizing is realized by an elastic body.

The button cover 224b stays somewhere between the first position (which projects toward the rear side of the operating device 10) and the second position (which is depressed toward the main body of the operating device 10), so that it can be depressed to the position at which it comes into contact with the arm 323 (this position will be referred as contact position). Thus, as the user grips the main body of the operating device 10 and depresses the button cover 224b with his or her forefinger, the button cover 224b moves to the contact position without imparting any substantial resisting force (there is only resistive force due to the energizing force originating from the button cover support 30). Thus, the button cover 224b comes into contact with the arm 323 at the contact position, thereby allowing the user to perceive as if he or she has touched a hard object.

If the user continues gripping with an increased force beyond the contact position, thereby enhancing the force to depress the button cover 224b, the motor 321 rotates so as to draw back the arm 323 toward the main body of the operating device 10. This action gives the user the sense of touch which makes the user feel that the object has been deformed by the user's gripping force. The user may also feel the difference in hardness if he or she changes the speed of rotation of the motor 321 according to the force with which the button cover 224b is depressed.

The motor 321 attached to the regulating part 32 is a servo motor or stepping motor, which is capable of controlling the rotation angle. The motor 321 may be a geared motor with an integrated gear head. The motor 321 works with the help of current supplied from the control circuit 322.

The control circuit 322 for the motor 321 supplies to the motor 321 with the current that varies in intensity according to the torque control value τ entered from the control part 11. The motor 321 produces a torque in proportion to the intensity of current, thereby activating the arm 323 in such a way that its end (that comes into contact with the button cover 224b) moves toward the button cover 224b. This torque is cancelled out by the pressing force applied to the button cover 224b (this pressing force is transmitted from the arm 323 as a rotating force in the direction opposite to the rotating direction of the motor 321). As the result, the button cover 224b moves toward the second position at a rate equivalent to the difference by which the pressing force exceeds the torque. If there is a balance between the pressing force and the torque, the button cover 224b becomes stable at the position for the balance.

In addition, the control circuit 322 may receive from the control part 11 an input in terms of rotation angle θ in place of the torque control value τ. The angle θ represents the range over which the end (in contact with the button cover 224b) of the arm 323 moves. The range of movement is defined such that "0" denotes the angle of the position where the button cover 224b is farthest from the initial position (at which no force is exerted onto the button cover 224b), and that "positive direction" denotes the angle in which the button cover 224b approaches its initial position. In this case, the control circuit 322 regulates the motor 321 to rotate through the rotation angle which has been entered, so that the motor rotates through an angle (equivalent to the angle θ) enough for the end of the arm 323 to move toward the button cover 224b. Incidentally, no detailed description is given here about the method for rotating a motor through a predetermined angle and stopping it, because it is a matter of common knowledge.

The arm 323 corresponds to the regulating member in the present invention. It is attached to the rotating shaft of the motor 321, so that it regulates the range of movement of the button cover 224b in response to the rotation angle θ of the motor 321. To be concrete in the case of the present embodiment, the arm 323 (depicted in FIG. 4) is arranged on the rear side of the button cover 224b or on the main body of the operating device 10 (or on the locus along which the button cover 224b moves). The arm 323 includes an arm member 323a and a disc-like arm proper 323c. In the case depicted in FIG. 4, the disc-like arm proper 323c has its center fixed to the rotating shaft of the motor 321. The arm member 323a is constructed integrally with the arm proper 323c, which has a part projecting in the direction of circumferential tangent line.

The arm 323 in the case depicted in FIG. 4 works in such a way that the end (contacting part) of the arm member 323a moves within the range of movement of the button cover 224b in response to the rotation angle of the motor 321. As the result, the button cover 224b can move to the part with which the arm member 323a comes into contact. That is, in the case of the present embodiment, the regulating member can be moved by the control part 11, the control circuit 322, and the motor 321 which work in concert with one another.

Figure 5:
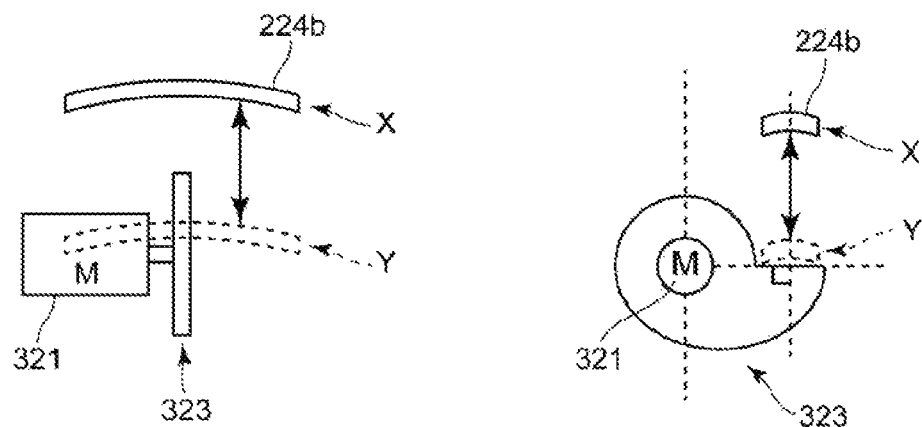
FIG. 5 is a schematic diagram depicting how an arm moves relative to a button cover in one embodiment of the present invention.
Figure 5:
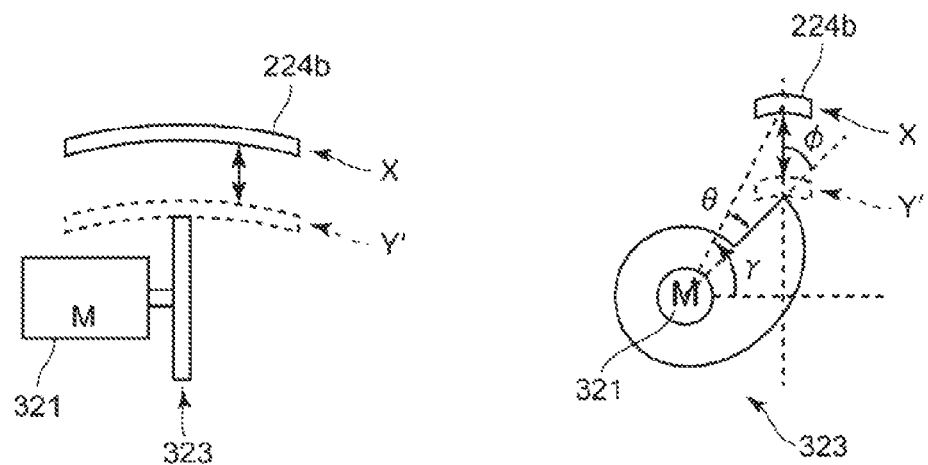

FIG. 5 is a conceptual diagram depicting the relationship between the arm 323 and the button cover 224b, which are depicted in FIG. 4. As depicted in FIG. 5, the arm 323 does not regulate the range of movement of the button cover 224b so long as the angle is obtuse (equal to or larger than 90 degrees) between the lengthwise direction (projecting direction) of the arm member 323a and the moving direction of the button cover 224b. Thus, the button cover 224b in this situation can move freely between the first position (indicated by X in FIG. 5(A)) and the second position (indicated by Y in FIG. 5(A)). This movement is only resisted by the energizing force of the button cover support 30.

In another instance where the arm 323 is rotated through an angle θ by the motor 321 so that the angle φ becomes acute (smaller than 90 degrees) between the arm member 323a (in the lengthwise direction or projecting direction) and the direction of movement of the button cover 224b, the end of the arm member 323a is positioned in the locus of movement of the button cover 224b. As the angle φ approaches "0," the contact position (indicated by Y' in FIG. 5(B)) for the arm member 323a and the button cover 224b approaches the first position (indicated by X in FIG. 5(B)) of the button cover 224b. This regulates the range over which the button cover 224b can be depressed.

Incidentally, the embodiment does not have its regulating part 32 restricted to the motor 321 and the arm 323 illustrated in FIG. 4. The regulating part 32 may be replaced by any drive means capable of defining the range of movement of the button cover 224b. Examples of such means include a linear actuator and a solenoid, which linearly move in the direction of movement of the button cover 224b and permits its end to come into contact with the button cover, thereby regulating the range of movement of the button cover 224b.

Figure 6:
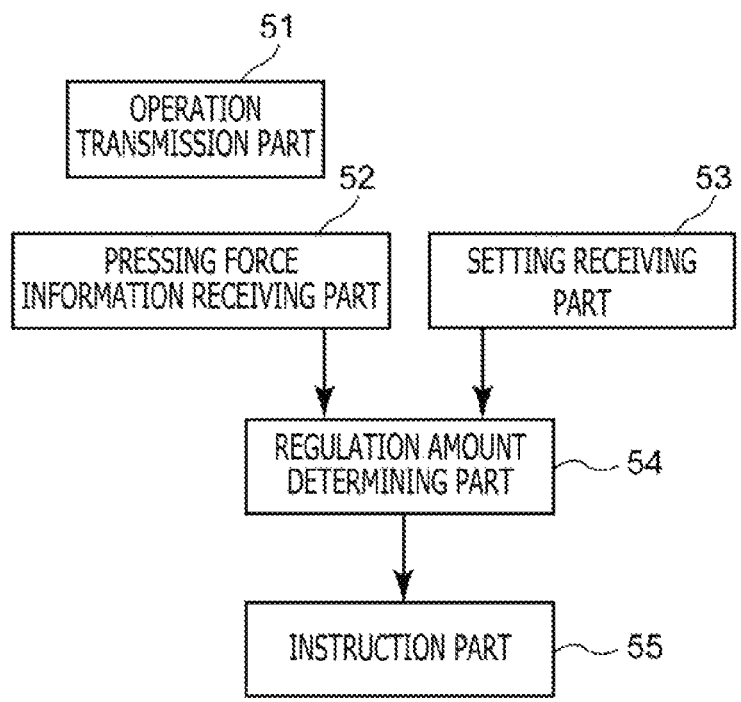
FIG. 6 is a block diagram depicting the functional units of the operating device pertaining to one embodiment of the present invention.

The control part 11 used in the embodiment of the present invention is described below. As depicted in FIG. 6, the control part 11 includes an operation transmission part 51, a pressing force information receiving part 52, a setting receiving part 53, a regulation amount determining part 54, and an instruction part 55.

The operation transmission part 51 receives signals representing the operation which the user has performed on the operation part 22 of the operating device 10, and it transmits them to the main unit 20 through the communication part 14.

The pressing force information receiving part 52 receives through the interface part 13 the information which the force sensor 31 has detected and then transmits the information to the regulation amount determining part 54. This information includes the magnitude of the force which the user's finger has applied to the rocking button 224.

The setting receiving part 53 receives the information from the main unit 20 through the communication part 14. This information includes the hardness of the virtual object to be presented. This information may be replaced by one which represents the hardness in terms of numerical values. The setting receiving part 53 transmits the received information (to be used for setting) to the regulation amount determining part 54.

The regulation amount determining part 54 processes the information entered from the pressing force information receiving part 52 and the setting information entered from the setting receiving part 53, thereby determining the range over which the rocking button 224 (as the movable part) can move, and subsequently it transmits the resulting information to the instruction part 55. To be concrete, the regulation amount determining part 54 processes the setting information (that represents the hardness to be presented) which has been entered from the setting receiving part 53, thereby determining the ratio r=τ/F, where F denotes the magnitude of the force applied to the rocking button 224 by the user, and τ denotes the torque control value to be output to the motor 321. In addition, the regulation amount determining part 54 obtains the torque control value τ for output on the basis of the ratio r (determined as mentioned above) and the information (entered from the pressing force information receiving part 52) related to the magnitude of the force F applied to the rocking button 224 by the user. The regulation amount determining part 54 outputs the torque control value τ (as information related to regulating amount) to the instruction part 55.

The instruction part 55 outputs the torque control value τ (as the information related to regulation entered from the regulation amount determining part 54) to the control circuit 322 of the motor 321. This causes the motor 321 to rotate, which in turn causes the arm 323 to rotate, thereby regulating the range over which the rocking button 224 can move.

(In the case where the regulation amount determining part outputs the rotation angle as the information related to regulating amount)

The regulation amount determining part 54 may also outputs the rotation angle θ in place of the torque control value τ as the information related to regulating amount. In this case, the regulation amount determining part 54 determines the ratio r'=v/F from the information entered from the setting receiving part 53, where F denotes the magnitude of the force applied to the rocking button 224 by the user, and v denotes the variable velocity per unit time (e.g., frequency to measure the force F) within the rotation angle θ of the motor 321. In addition, the regulation amount determining part 54 obtains the variable velocity v per unit time from the information related to the magnitude of force F applied to the rocking button 224 by the user (with the information being entered from the pressing force information receiving part 52) and the ratio r' which has been determined as mentioned above. Moreover, the regulation amount determining part 54 obtains the rotation angle θ to be output by adding the variable velocity v to the present rotation angle θp of the motor 321.

In another case, the regulation amount determining part 54 determines the ratio r"=θ/F, where F denotes the magnitude of the force applied to the rocking button 224 by the user and θ denotes the rotation angle of the motor, from the setting information entered from the setting receiving part 53 instead of using the variable velocity v. Then, the regulation amount determining part 54 obtains the rotation angle θ to be output, on the basis of the information related to the magnitude of the force F applied to the rocking button 224 by the user (with the information being entered from the pressing force information receiving part 52) and the information related to the ratio r" determined as mentioned above.

Finally, the regulation amount determining part 54 gives the instruction part 55 the information (for regulation) related to the rotation angle θ which has been obtained as mentioned above.

In this case, the instruction part 55 outputs the rotation angle θ (as the information related to the amount of regulation which is entered from the regulation amount determining part 54) to the control circuit 322 of the motor 321. Thus, the control circuit 322 causes the motor 321 to rotate through this rotation angle θ, so that the arm 323 rotates to vary the contact position within the movable range of the rocking button 224.

Incidentally, the ratios r and r' in the foregoing regulation may be established in such a way that the force f to push back the rocking button 224 by the rotating action of the motor 321 does not exceed the force F applied by the user, when the motor 321 is controlled according to such ratios. Alternatively, they may be established in such a way that the force to push back the rocking button 224 by the rotating action of the motor 321 is equal to or larger than the force F applied by the user.

(Action)

Figure 7:
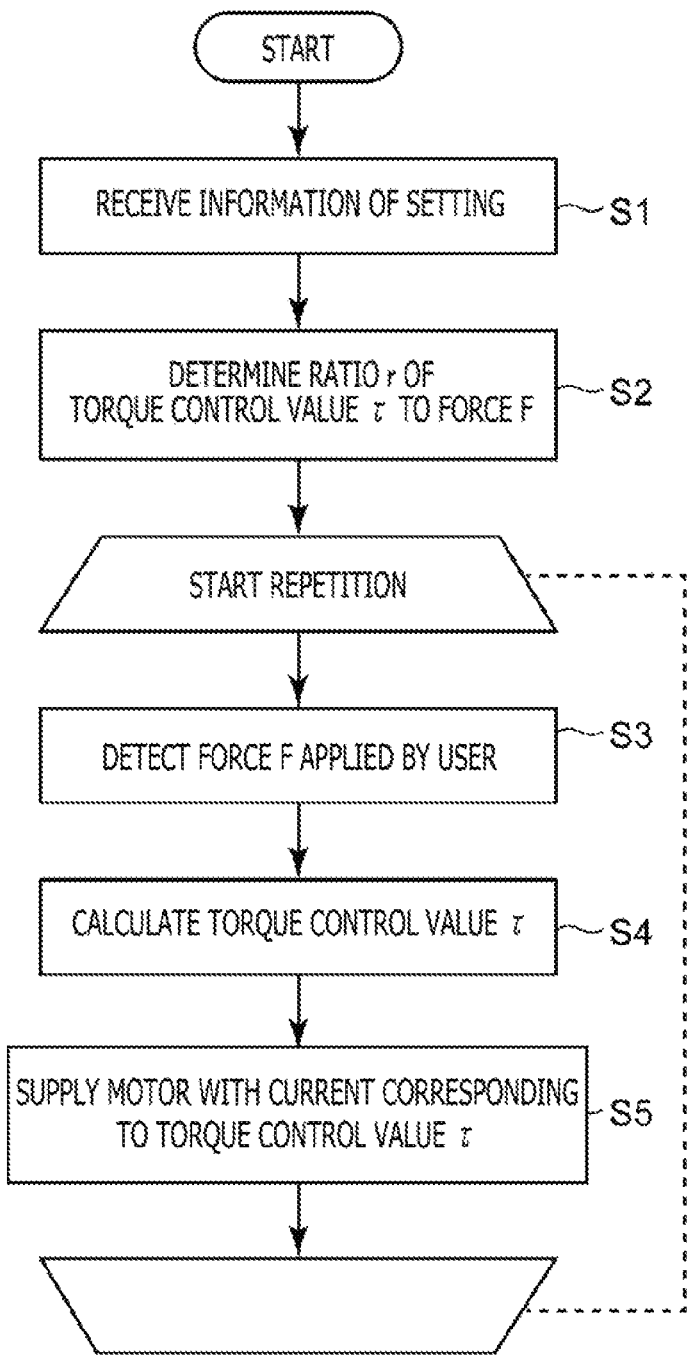
FIG. 7 is a flow chart depicting the working of the operating device pertaining to one embodiment of the present invention.

The operating device 10 according to the embodiment of the present invention is basically constructed as mentioned above, and it functions as follows. As depicted in FIG. 7, the operating device 10 receives the setting information related to the hardness of the virtual object from the main unit 20 of the home game machine (S1). Next, the operating device 10 determines the ratio (r=τ/F) based on this setting information, where F denotes the magnitude of the force applied to the rocking button 224 by the user, and r denotes the torque control value to be output to the motor 321 (S2).

Subsequently, the operating device 10 causes the force sensor 31 to detect the magnitude of the force applied to the rocking button 224 by the user's finger, repeatedly at a frequency of 1 kHz, for instance (S3). At each time the force sensor 31 detects the magnitude of the force F applied to the rocking button 224 by the user, the operating device 10 calculates the torque control value T for output from the thus detected magnitude of force F and the ratio r which has been determined previously (S4).

The operating device 10 supplies to the motor 321 with current corresponding to the torque control value τ (S5). According to the present embodiment, the motor 321 is controlled by individual parts within the operating device 10 (or without communication with the main unit 20) at each time the force sensor 31 detects the magnitude of the force applied to the rocking button 224. In other words, this step is repeated until any interruption for other instructions is given from the main unit 20 at prescribed timing.

Figure 8:
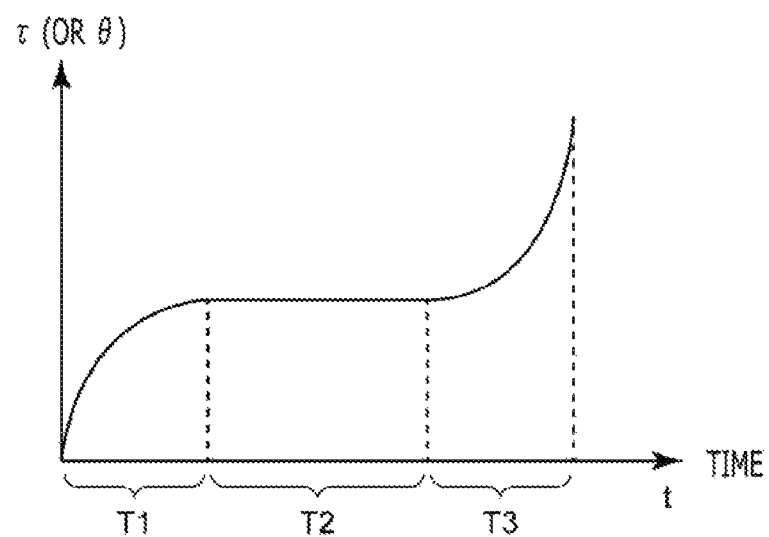
FIG. 8 is a graph depicting the working of the operating device pertaining to one embodiment of the present invention.

The foregoing control causes the motor 321 to rotate with a torque corresponding to the supplied current, so that the end (contact part) of the arm 323 moves toward the button cover 224b. The result is that the torque and the user's pressing force onto the button cover 224b cancel each other, so that the button cover 224b moves toward the second position at a rate corresponding to the difference by which the pressing force exceeds the torque. Incidentally, FIG. 8 is a graph in which the horizontal axis represents time and the vertical axis represents the torque control value τ. The first and third regions (T1 and T3) represent the state in which the user's pressing force is gradually increasing and the torque control value τ also increases in response to it. The second region (T2) represents the state in which the user is depressing the button cover 224b with an approximately constant force and the torque control value τ remains constant.

(Example of Power Saving)

According to the foregoing description, the motor 321 is under control in response to the torque control value τ (or the corresponding rotation angle θ) while the button cover 224b is kept depressed by the user, as depicted in FIG. 8. Consequently, the motor 321 is continuously supplied with electric current, which leads to a large power consumption.

The foregoing will be remedied by the embodiment mentioned below, in which the control part 11 checks the change with time of the torque control value τ or the rotation angle θ as the information of regulating amount and calibrates them if the change is within a prescribed range and instructs the regulating part 32 to regulate the button cover 224b (as the movable part) to move within its moving range (first power saving control).

To be concrete, the modified embodiment 1 is put into practice as follows. The control part 11 causes the regulation amount determining part 54 to determine the moving range of the rocking button 224 (as the movable part) on the basis of the information entered from the pressing force information receiving part 52 and the information entered from the setting receiving part 53. At this time, the regulation amount determining part 54 accumulates and stores in the memory part 12 the amount of regulation which has been determined before a prescribed period of time (for example, two seconds).

Then, the regulation amount determining part 54 obtains the difference between the maximum and minimum values which have been determined previously (for example, two seconds) and stored, and it decides whether or not the difference is smaller than the predetermined threshold value. If the result is affirmative, the regulation amount determining part 54 decides that the change with time of the regulating amount is within the prescribed range and calibrates the information related to the previously determined amount of regulation.

This calibration is accomplished in the following way, for example. The regulation amount determining part 54 measures the time t which has elapsed from the point at which it decided that the change with time of the regulating amount is within a prescribed range (the elapsed time t may be the value of the counter with an increment at regular timing). Thus, the regulation amount determining part 54 makes calibration to reduce the torque control value τ and the rotation angle θ in response to the elapsed time. In an example depicted below, calibration is performed on the torque control value τ to give the calibrated torque control value τ', as follows.

$$\tau' = \tau \times \exp[-\alpha t]$$

where, α is a positive parameter constant which is previously established, and exp[ ] is an exponential function. The calibrated torque control value τ' is output to the instruction part 55 by the regulation amount determining part 54.

The same as above is also applied to the control that is based on the rotation angle θ. In this case, the following equation is given.

$$\theta' = \theta \times \exp[-\alpha t]$$

where, θ denotes the determined rotation angle and θ' denotes the calibrated rotation angle.

The calibrated angle θ' is output to the instruction part 55.

Incidentally, the regulation amount determining part 54 makes decision as follows. If the stored difference between the maximum and minimum values of the regulating amount which has been determined before a prescribed period of time (for example, two seconds) is not lower than the prescribed threshold value, it is decided that the change with time of the regulating amount is not within the prescribed range. In this case, the regulation amount determining part 54 outputs to the instruction part 55 the torque control value τ and the rotation angle θ (which are the regulating amount which have been just determined) without alteration. Incidentally, in this case, the regulation amount determining part 54, which is measuring the time t which has elapsed from the point at which it decides that the change with time of the regulating amount is within the prescribed range, discontinues timing and resets the value of t to "0."

Figure 9:
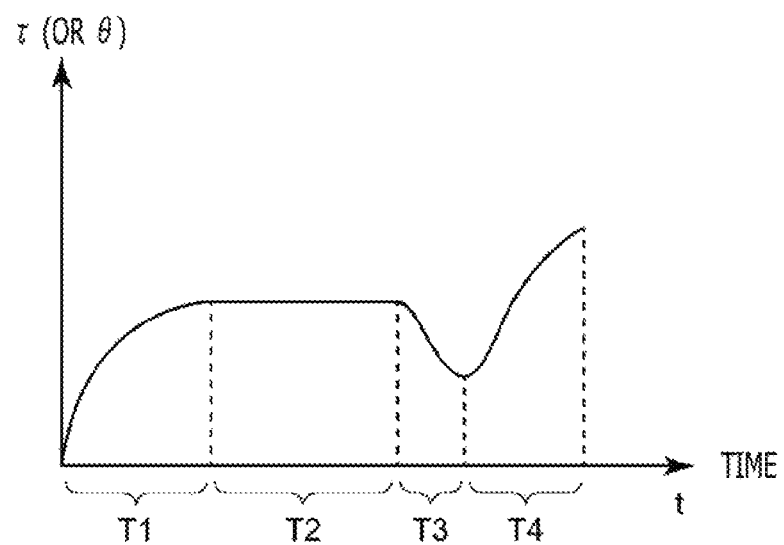
FIG. 9 is a graph depicting how the operating device pertaining to one embodiment of the present invention works in a first mode.

According to the embodiment just mentioned above, the operating device 10 increases the torque control value τ during the period T1 in which the user's depressing force is gradually increasing as depicted in FIG. 9. The period T1 is followed by the period T2 in which the user keeps depressing the button cover 224b at an approximately constant force for a prescribed period of time (for example, two seconds). In this period, a constant torque control value τ is maintained, and subsequently (in period T3) the torque control value τ is adjusted for reduction. The period T3 is followed by the period T4 in which the user gradually increases the depressing force and the operating device 10 increases the torque control value τ accordingly. As compared with the result of regulation depicted in FIG. 8, the regulation in the foregoing manner decreases the amount of torque (integrated over the period of time) as well as the amount of power consumption.

Incidentally, according to the illustrated embodiment, the user is given, in the period T3, the sense of touch as if the rocking button 224 is being depressed even though the user's depressing force remains unchanged. If the sense of touch like this is not undesirable, the torque control value τ may be reduced during the period T3 according to the elapsed time. This weakens the sense of touch which makes the user to feel as if the rocking button 224 is being depressed.

The method for power saving is not restricted to the one mentioned above. According to the second method for power saving, the control part 11 instructs the regulating part 32 to regulate the movable range of the rocking button 224 on the basis of the change with time of the regulating amount which is determined in place of the calibrated torque control value τ or the calibrated rotation angle θ (which are the information related to the amount of regulation), while the torque control value τ or the rotation angle θ are within a prescribed range.

In the case of regulation mentioned above, the control part 11 causes the regulation amount determining part 54 to determine the amount of regulation for the movable range of the rocking button 224 on the basis of the information entered from the pressing force information receiving part 52 and the information entered from the setting receiving part 53. At this time, the regulation amount determining part 54 stores in the memory part 12 the amount of regulation which was determined before and the amount of regulation which has been determined this time.

Then, the regulation amount determining part 54 obtains the difference (change in time) between the previously stored amount of regulation and the newly determined amount of regulation and decides whether or not the difference is larger than the previously established threshold value. If the answer is affirmative, the regulation amount determining part 54 outputs to the instruction part 55 the torque control value τ and the rotation angle θ (which have been just obtained) without alteration.

In the case where the above-mentioned difference (change with time of the amount of regulation) does not exceed the predetermined threshold value, the regulation amount determining part 54 performs regulation such that the torque control value τ or the rotation angle θ (as the amount to be regulated) is changed to the predetermined value β (for example, "0"). This calibration is accomplished in the following way, for example. The regulation amount determining part 54 measures the time t which has elapsed from the point at which it decided that the change with time of the regulating amount does not exceed the predetermined threshold value (the elapsed time t may be the value of the counter with an increment at regular timing). Thus, the regulation amount determining part 54 calibrates the torque control value τ and the rotation angle θ in response to the elapsed time t. In an example depicted below, calibration is performed on the torque control value τ to give the calibrated torque control value τ', as follows.

$$\tau' = \tau \times \exp[-\alpha t] + \beta$$

where, α is a positive parameter constant which is previously established. β is the set value after change, and it may be established as "0," for example. Also, exp[ ] is an exponential function. The calibrated torque control value τ' is output to the instruction part 55 by the regulation amount determining part 54.

The foregoing is also applied to the case in which the rotation angle θ is used to perform regulation. That is, the rotation angle θ which has been determined is calibrated to give θ'=θ×exp[−αt]+β, and the calibrated rotation angle θ' is output to the instruction part 55.

Figure 10:
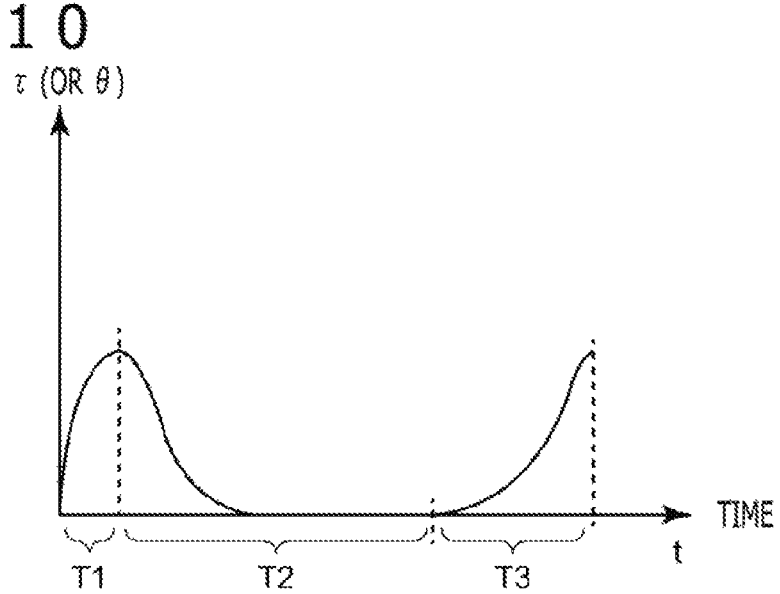
FIG. 10 is a graph depicting how the operating device pertaining to one embodiment of the present invention works in a second mode.

The operation according to this example is illustrated in FIG. 10. During the period T1 in which the user increases his or her depressing force gradually, the operating device 10 increases the torque control value τ accordingly. During the subsequent period in which the user continues depressing the button cover 224b with an approximately constant force, the operating device 10 changes the torque control value τ to "0" over a prescribed period of time (period T2). As long as the user continues depressing the button cover 224b with an approximately constant pressure, the operating device 10 continues controlling the motor 321 with the torque value which has previously been fixed at "0," for example (incidentally, if the torque control value τ is "0," the motor 321 remains at rest). As the user begins to gradually increase the depressing force again (in the period T3), the operating device 10 increases the torque control value τ accordingly. The regulation in this manner decreases the amount of torque (integrated over the period of time), thereby reducing the consumption of electric power more than the regulation illustrated in FIGS. 8 and 9.

Incidentally, according to this example, the user is given the sense of touch as if the rocking button 224 is depressed to the second position even though the depressing force remains unchanged during the period T2. The case in which such a sense of touch is unnecessary would be coped with by reducing the torque control value τ in response to the elapsed time. This weakens the sense of touch which the user feels as if the rocking button 224 is depressed.

Moreover, the control part 11 may perform either the first action or the second action based on the results obtained under predetermined conditions. The first action is intended to calibrate the predetermined amount of regulation while it changes with time within a prescribed range and to instruct the regulating part 32 to regulate so that the movable part moves over the amount of regulation which has been calibrated (the first regulation for power reduction). The second action is intended to instruct the regulating part 32 to regulate so that the movable part moves over the amount of regulation based on the change with time of the previously determined amount of regulation (the second regulation for power reduction).

The predetermined conditions mentioned above may be those which are based on the instructions (for the user's setting) given from the main unit 20. In addition, it may be possible to fix that the control part 11 performs either the first action or the second action according to the conditions that depend on the ability (residual battery capacity) of the power source part 15 to supply electric power. According to this example, for example, it is possible to set up such that neither the first action or the second action takes place (or the regulation is performed within the determined amount of regulation) while there is a sufficient residual battery capacity, or the first action takes place while the residual battery capacity is lower than the first threshold value and higher than the second threshold value (which is smaller than the first threshold value), or the second action does not take place while the residual battery capacity is lower than the second threshold value. The foregoing causes the regulation to be performed, with the power consumption reduced in response to the residual battery capacity.

The reduction of power consumption may be accomplished in any other way than mentioned above instead of determining the torque control value τ or the rotation angle θ on the basis of the force F detected by the force sensor 31. Any method is applicable so long as it is capable of regulation based on the torque control value τ or the rotation angle θ which is determined by some sort of method.

An example of such methods consists of regulating the torque of the motor 321 and regulating the stiffness of the button cover 224b (rocking button 224) in response to the information related to the change in angle of the arm 323 which results from the depressing force of the user's finger, instead of using the force sensor 31.

An applicable method in this case may be the PD-control method which is in common use. It is so designed as to change the value of P-gain, thereby changing the sense of hardness. This method is suitable for the control to reduce power consumption as follows.

According to the conventional method of operation, the user depresses the button cover 224b with his or her finger and continues this action after a short pause to depress the button cover 224b further (in the second direction), as depicted in FIG. 8 which illustrates the change with time. If the ordinary PD-control is performed in this case, the torque value of the motor changes as depicted in FIG. 8, which suggests that the torque is output continuously over the period of T2. This indicates a comparatively large power consumption.

To remedy this situation, the value of output torque is calibrated by the above-mentioned method as depicted in FIGS. 9 and 10. In this way it is possible to reduce power consumption. However, the conventional PD-control has the disadvantage that the calibration of output torque reduces torque and hence the arm 323 is depressed further and the angle and output torque change, making it impossible to suppress the torque and reduce the power consumption as desired. Therefore, the ordinary PD-control is not applied to the change in angle of the arm 323 that occurs when the output torque is calibrated.

The foregoing procedure may be modified in such a way that the PD-control is not employed but the controller directly specifies the torque value of the motor by the instruction of the application program (such as game application). In this case, it would be possible to make the game application express hardness corresponding to the action of "gripping an object." The operation in this case is performed in such a way that the torque calibration illustrated in FIGS. 9 and 10 is effective but the change in angle of the arm and button cover that results from the torque calibration mentioned above does not affect the procedure by the game application (the game application is controlled such that it does not perform the procedure corresponding to the result of calibration).

Modified Embodiment

The foregoing embodiment has been explained on the assumption that the button cover 224b and the arm 323 are not linked with each other. However, there is a possibility of constructing a system in which the button cover 224b and the arm 323 are linked with each other.

In this case, too, the arm 323 is attached to the rotating shaft of the motor 321, so that the button cover 224b has its movable range controlled in response to the rotation angle θr of the motor 321. The motor 321 runs with the electric current supplied from the control circuit 322 in response to the torque control value τ which is entered from the control part 11.

In the case of the present embodiment, the button cover 224b, with which the arm 323 is linked, moves to the first position when the rotation angle θ of the motor 321 is θ0, and the button cover 224b moves to the second position when the rotation angle θ of the motor 321 is θ1 (θ0≠θ1).

Also, in the case of this example, the control circuit 322 supplies to the motor 321 with the electric current of magnitude corresponding to the torque control value τ while it is being supplied with the regulation value τ. In addition, the control circuit 322 decides whether or not the rotation angle θr of the motor 321 is equal to θ0 while the torque control value τ is not being entered from the control part 11. If the answer is negative, the control circuit 322 supplies to the motor 321 with the electric current of predetermined magnitude so as to make the motor 321 rotate through the rotation angle θ0. In the case where the button cover 224b and the arm 323 are not linked with each other, the amount of the electric current to be supplied should be experimentally established on the assumption that the amount of current is large enough to move the button cover 224b with a force corresponding to the energized force to move the button cover 224b to the first position. In this example, the energizing means is realized by the action of the control circuit 322.

REFERENCE SIGNS LIST

10 Operating device, 11 Control part, 12 Memory part, 13 Interface part, 14 Communication part, 15 Power source part, 20 Main unit, 21 Grip part, 22 Operation part, 30 Button cover support, 31 Force sensor, 32 Regulating part, 51 Operation transmission part, 52 Pressing force information receiving part, 53 Setting receiving part, 54 Regulation amount determining part, 55 Instruction part, 100 Circuit part, 221 Sensor part, 222 Button control part, 223 Finger sensor, 224 Rocking button, 224b Button cover, 321 Motor, 322 Control circuit, 323 Arm, 323a Arm member, 323c Arm proper.

The invention claimed is:

1. An operating device comprising:
a grip part to be gripped by a user; and
an operation part which is approached by a finger of the user gripping the grip part, wherein the operation part includes:
a movable part capable of moving between a first position and a second position in response to a force applied by the finger of the user,
energizing element for energizing the movable part toward the first position, where the energizing element is facilitated by an elastically activated element biasing the movable part toward the first position,
a regulating member that moves rotationally along a moving locus of the movable part and regulates a range between the first position and the second position, including a first sub-range between the first position and an intermediate position within which the movable part is permitted to move freely in response to the force applied by the finger of the user without opposition by the regulating member and substantially only biased by energizing element, wherein: (i) the regulating member is not coupled to, and does not contact, the movable part in the first sub-range between the first position and the intermediate position, and (ii) the regulating member is coupled to the movable part in a second sub-range from the intermediate position to the second position, and
a motorized assembly operating to apply a rotational force that rotationally moves the regulating member toward the first position in opposition to the force applied by the finger of the user that moves the regulating member toward the second position when the movable part is depressed toward the second position beyond the first sub-range in which the movable part can move freely.

2. The operating device of claim 1, further comprising:
a control part that determines an amount of regulation provided by the regulating member and an amount which the movable part can move and provides the regulating part with an instruction to regulate the range in which the movable part can move according to the amount of regulation which has been determined.

3. The operating device as defined in claim 2, further comprising:
a force sensor that detects a magnitude of a force applied to the movable part,
wherein the regulating part determines, based on the magnitude of force detected by the force sensor, the amount of regulation for the range in which the movable part can move and provides the regulating part, based on the amount of regulation which has been determined, with an instruction to regulate the range in which the movable part can move.

4. The operating device as defined in claim 2, wherein the control part calibrates the amount of regulation when the amount of regulation which has been determined changes with time in a prescribed range and provides the regulating part with an instruction to regulate the range in which the movable part can move as much as the amount of regulation which has been calibrated.

5. The operating device as defined in claim 4, wherein the control part provides, based on the change with time of the amount of regulation which has been determined, the regulating part with an instruction to regulate the range in which the movable part can move.

6. The operating device as defined in claim 4, wherein the control part determines, based on a predetermined condition, to perform which one of
a first action to provide the regulating part with an instruction to calibrate the amount of regulation when the change with time of the amount of regulation which has been determined is within a prescribed range and to regulate the range in which the movable part can move as much as the amount which has been calibrated, and
a second action to provide, based on the change with time of the amount of regulation which has been determined, the regulating part with an instruction to regulate the range in which the movable part can move, and
the control part performs either the first action or the second action based on the result obtained from what has been determined.

7. A method for controlling an operating device, the method comprising:
detecting a magnitude of a force applied to a movable part of the operating device, where the movable part is capable of moving between a first position and a second position;
biasing the movable part toward the first position via an energizing element having an elastically activated element biasing the movable part toward the first position;
moving a regulating member rotationally along a moving locus of the movable part in order to regulate a range between the first position and the second position, including a first sub-range between the first position and an intermediate position within which the movable part is permitted to move freely in response to the force applied by the finger of the user without opposition by the regulating member and substantially only biased by energizing element, wherein: (i) the regulating member is not coupled to, and does not contact, the movable part in the first sub-range between the first position and the intermediate position, and (ii) the regulating member is coupled to the movable part in a second sub-range from the intermediate position to the second position; and the moving the regulating member includes, via a motorized assembly, applying a rotational force that rotationally moves the regulating member toward the first position in opposition to the force applied by the finger of the user that moves the regulating member toward the second position when the movable part is depressed toward the second position beyond the first sub-range in which the movable part can move freely.

* * * * *